United States Patent [19]

Mark

[11] Patent Number: 4,983,082
[45] Date of Patent: Jan. 8, 1991

[54] EXPANSION ANCHOR ASSEMBLY
[75] Inventor: Fritz Mark, Mäder, Austria
[73] Assignee: Hilti Aktiengesellschaft, Fürstentum, Fed. Rep. of Germany
[21] Appl. No.: 421,928
[22] Filed: Oct. 16, 1989
[30] Foreign Application Priority Data
Oct. 15, 1988 [DE] Fed. Rep. of Germany ....... 3835243
[51] Int. Cl.$^5$ .............................................. F16B 13/06
[52] U.S. Cl. ....................................... 411/60; 411/55; 411/68
[58] Field of Search ........................ 411/43, 54, 55, 57, 411/60, 61, 62, 63, 64, 65, 66, 68

[56] References Cited
U.S. PATENT DOCUMENTS

| | | | |
|---|---|---|---|
| 1,604,762 | 10/1926 | Slocum | 411/55 |
| 2,010,553 | 8/1935 | McIntash | 411/60 |
| 4,678,383 | 7/1987 | Bergner | 411/55 |
| 4,797,044 | 1/1989 | Velasco | 411/55 |

FOREIGN PATENT DOCUMENTS
3535618  4/1987  Fed. Rep. of Germany ........ 411/55

Primary Examiner—Neill R. Wilson
Attorney, Agent, or Firm—Toren, McGeady & Associates

[57] ABSTRACT

An expansion anchor assembly to be secured in a borehole is made up of an expansion sleeve and an anchor rod. The expansion sleeve has a plurality of expansion sections arranged to be deflected radially outwardly by drawing an expansion cone on the front end of the anchor rod into the sleeve. Each expansion section has a circumferentially extending weakened section forming a bending location. The weakened section is located between a radially inner and a radially outer recess in the expansion section. Each of the recesses has a rectilinear base extending tangentially relative to the expansion sleeve axis with the bases located in a plane disposed normal relative to the expansion sleeve axis.

7 Claims, 2 Drawing Sheets

4,983,082

EXPANSION ANCHOR ASSEMBLY

BACKGROUND OF THE INVENTION

The present invention is directed to an expansion anchor assembly to be secured in a borehole and comprises an expansion sleeve and an anchor rod. The expansion sleeve includes a plurality of shell-shaped expansion sections extending from the leading end of the sleeve toward its trailing end. The expansion sections are spaced apart in the circumferential direction by axially extending slots. By drawing an expansion cone on the end of the anchor rod into the expansion sleeve, the expansion sections can be deflected radially outwardly by bending at a weakened section located between circumferentially extending radially inner and radially outer recesses.

An expansion anchor assembly to be fastened in boreholes with a conical widening is disclosed in U.S. Pat. No. 4,519,753. The expansion anchor assembly includes an expansion sleeve with shell-shaped expansion sections and an anchor rod with an expansion cone. The expansion sections are deflected radially outwardly by drawing the expansion cone into the conical widening of the boreholes to form a positive-locking engagement. In deflecting the expansion sections, they are bent around a weakened section which connects them to an adjacent portion of the expansion sleeve.

The weakened section is formed by inner and outer recesses in the form of grooves extending in the circumferential direction of the expansion sections. The weakened sections comprise a cross-sectional configuration in axial projection shaped as a circular arc. Such a configuration is distinguished, based on the known strength of materials, by a high moment of resistance. Consequently, high forces are required to achieve the deflection of the expansion sections and such forces are introduced as radial forces in the region of the borehole wall adjoining the conically widened part and opposite to the insertion direction of the assembly. Such forces can damage this region of the receiving material containing the borehole and, as a result, impair the anchorage of the expansion anchor assembly.

SUMMARY OF THE INVENTION

Therefore, the primary object of the present invention is to provide an expansion anchor assembly where only small forces are required for the deflection of the expansion sections so that damage to the borehole is avoided.

In accordance with the present invention, the expansion sections of the expansion sleeve have recesses where the recess bases extends rectilinearly and tangentially with respect to the expansion sleeve axis, and with the recesses located in a plane normal to the sleeve axis.

The configuration of the recesses, according to the present invention, leads to a cross-sectional weakened section which serves as a bending location with the weakened section having a substantially rectangular or trapezoidal shape. The smaller dimension of the rectangle or trapezoid, arranged radially relative to the expansion sleeve axis, affords a considerable reduction in the moment of resistance to be overcome in the radial deflection of the expansion sections. As a consequence, in the process of bending the expansion sections, only negligible radial forces act on the borehole wall. Further, if the expansion anchor is subsequently removed by pulling it out of the borehole, only a correspondingly small moment of resistance needs to be overcome in bending back the expansion sections.

Preferably, in the circumferential direction, the base of the recesses ends inside the arc-shaped inner and outer contours of the expansion sections.

In a preferred arrangement, one of the recesses is V-shaped. Such a V-shaped recess is advantageously used as the radially inner recess.

The other base is preferably formed as the bottom of a U-shaped recess. When the U-shaped recess is the radially outer recess it has a clear width allowing a sharp deflection of the expansion sections without the flanks of the recess contacting one another and impeding the deflection. This feature is especially advantageous in boreholes where the conically widened portion has a large cone angle.

Preferably, the cross section remaining between the recesses has a width, measured in the radial direction, corresponding to 0.3 to 0.5 times the wall thickness of the expansion sections. As a result, a small cross-sectional area is provided which reduces the moment of resistance involved during the deflection of the expansion sections, and such area has a sufficient breaking strength.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figures 1, 2:
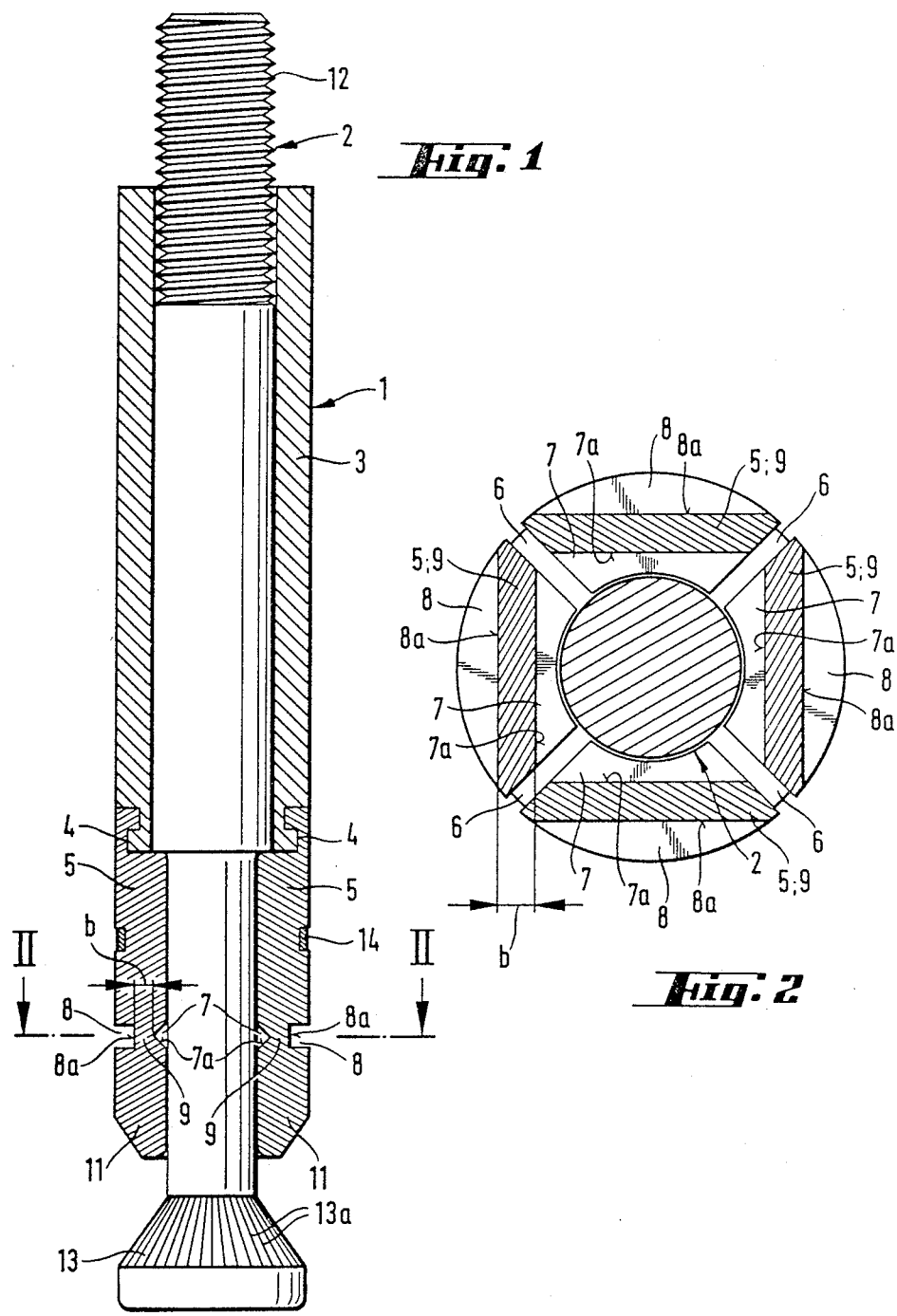
FIG. 1 is an axially extending sectional view of an expansion anchor assembly in its initial position for insertion into a borehole.
FIG. 2 is a cross-sectional view taken along the line II—II in FIG. 1.

In FIG. 1, an expansion anchor assembly is shown made up of an axially elongated expansion sleeve 1, and an axially elongated anchor rod 2, extending through the sleeve. Each of the sleeve 1 and the rod 2 has a first or leading end at the lower end as viewed in FIG. 1, and a second or trailing end at the upper end. Expansion sleeve 1 has an axially extending tubular portion 3 extending from the second end toward the first end, with four shell-shaped sections 5 fastened to the tubular portion 3 by a claw connection 4. The shell sections 5 are separate from one another in the circumferential direction and are spaced apart by axially extending slots 6, note FIG. 2. In the shell-shaped sections 5 spaced from the connection to the tubular section 3 and from the first end of the expansion sleeve, the shell-shaped sections each have a V-shaped radially inner recess 7, and a U-shaped radially outer recess 8, with the recesses located in a common plane extending normal to the expansion sleeve axis. The recesses 7, 8 extend tangentially relative to the expansion sleeve axis and, as a result, each recess has a base 7a, 8a extending rectilinearly and located in the plane normal to the sleeve axis. Due to the arrangement of the radially inner and radially outer recesses 7, 8, a weakened section 9 is provided between the recesses in each shell section and serves as a bending location for shell-shaped expansion sections 11 extending between the recesses and the first end of the expansion sleeve 1. The weakened section 9 has a width or radial dimension b, corresponding to 0.3 to 0.5 times the wall thickness or radial dimension of the expansion sections. The shell sections 5 can be held together on the tubular section 3 by known means, such as a spring ring 14.

At its second end, the anchor rod 2 has an axially extending external thread 12 for applying a load to the expansion anchor assembly. The anchor rod extends axially through the expansion sleeve and has an expansion cone 13, at the first end of the sleeve, with the cone located outwardly from the first end of the expansion sleeve, as shown in FIG. 1. Expansion cone 13 can be drawn into the expansion sleeve 1 between the expansion sections 11 and has axially extending notches 13a on its conical surface.

Figure 3:
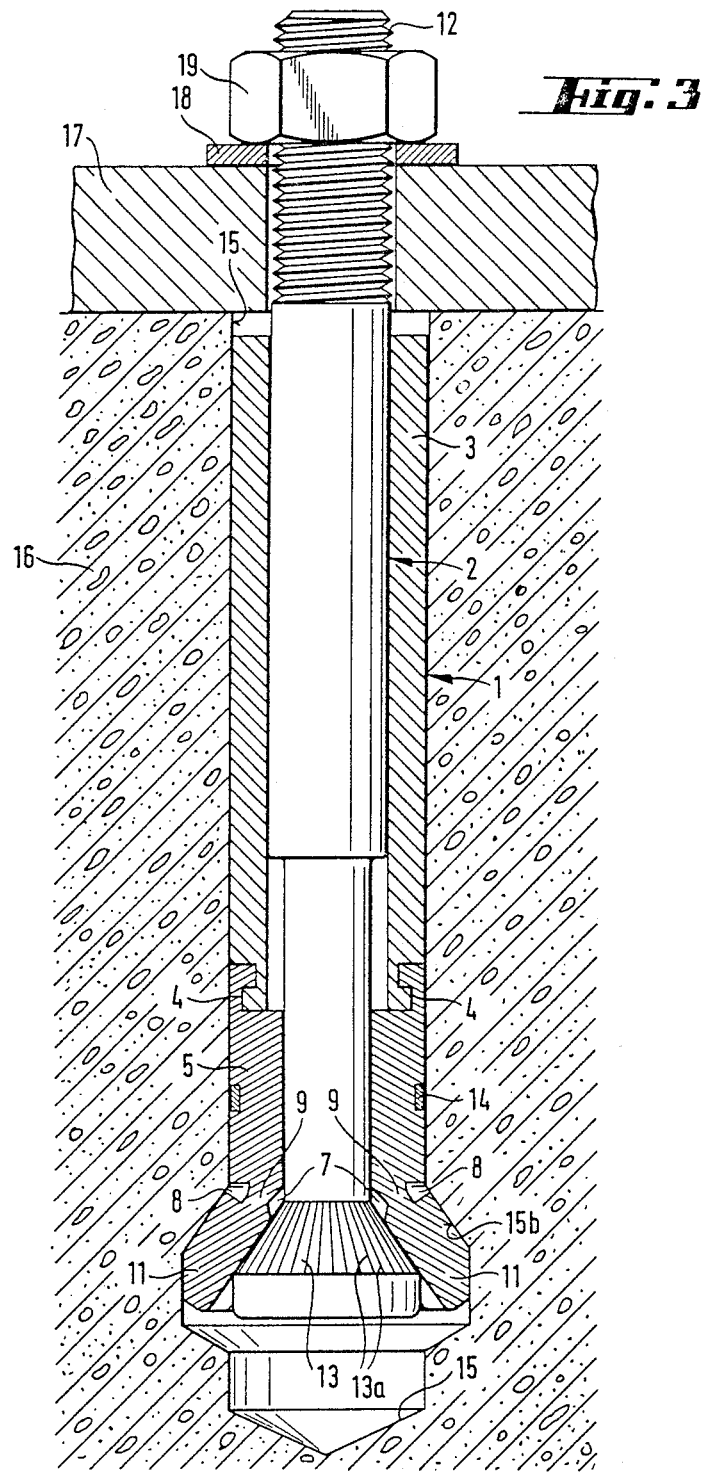
FIG. 3 is a view similar to FIG. 1, however, illustrating the expansion anchor assembly inserted into a borehole with the expansion sections deflected radially outwardly.

As shown in FIG. 3, in use the expansion anchor assembly is inserted into a borehole 15 in the condition as shown in FIG. 1. Borehole 15 has a conically widened portion 15b close to the borehole base 15a. The widened portion converges inwardly toward the outside surface of the receiving material or structural component part 16. As shown in FIG. 3, the assembly secures a part 17 to the concrete structural component part 16.

To secure the expansion anchor assembly in the borehole 15, the anchor rod 2 is drawn into the expansion sleeve 1 in the direction opposite to the insertion direction into the borehole. As a result, expansion cone 13 moves between the expansion sections 11 in the region of the widened portion 15b of the borehole and radially deflects the expansion sections 11. As can be seen in FIG. 3, the expansion sections 11 are displaced radially outwardly into the widened section 15b affording a positive locking engagement between the assembly and the component part 16. The expansion cone 13 prevents the expansion sections 11 from reverse displacement into their original positions as shown in FIG. 1.

The part 17 is fastened to the component part 16 by means of a washer 18 and a nut 19 screwed onto the thread 12 at the second end of the anchor rod 2. When the part 17 is being connected, the anchor rod 2 must be prevented from rotating within the sleeve 1. Accordingly, axially extending notches 13a are formed in the conical surface of the expansion cone 13 and, as a result, the cone digs into the inner surface of the expansion sections 11 preventing rotation of the anchor rod relative to the sleeve.

While specific embodiments of the invention have been shown and described in detail to illustrate the application of the inventive principles, it will be understood that the invention may be embodied otherwise without departing from such principles.

I claim:

1. Expansion anchor assembly arranged to be secured in a borehole formed in a receiving material, comprising an axially elongated expansion sleeve having a first end and a second end spaced apart in the axial direction, and an axially elongated anchor rod arranged to extend through said sleeve, said anchor rod having a first end and a second end, said expansion sleeve having a plurality of expansion sections extending axially from the first end toward the second end of said expansion sleeve, said expansion sections are spaced apart in the circumferential direction by axially extending slots, said anchor rod has an expansion cone on the first end thereof for displacing said expansion sections radially outwardly when said cone is drawn into the first end of said sleeve toward the second end thereof, each of said expansion sections has a circumferentially extending weakened section spaced axially from the first end of the expansion sleeve, said weakened sections are located between a first recess formed in a radially inner surface of said expansion sections and a second recess formed in a radially outer surface of said expansion sections, said weakened sections acting as a bending location for said expansion sections, wherein the improvement comprises that each of said first and second recesses has a base extending rectilinearly and tangentially relative to the axis of said expansion sleeve, said first and second recess bases are located in a common plane disposed normal to the axis of said expansion sleeve, and said weakened sections in combination form a hollow rectangular cross section transversely of the expansion sleeve axis.

2. Expansion anchor assembly, as set forth in claim 1, wherein said first recess is V-shaped.

3. Expansion anchor assembly, as set forth in claim 1, wherein said second recess is U-shaped and the base of said U-shaped second recess is planar.

4. Expansion anchor assembly, as set forth in claim 1, wherein said weakened section located between the bases of said first and second recesses has a dimension in the radial direction of said expansion sleeve in the range of 0.3 to 0.5 times the radial dimension of said expansion section outside said weakened section.

5. Expansion anchor assembly, as set forth in claim 1, wherein said expansion sleeve has a tubular section extending from the second end thereof toward the first end, said expansion sections extending from the end of said tubular section closer to the first end of said expansion sleeve to the first end of said expansion sleeve, and said expansion sections being secured to said tubular section by claw connections.

6. Expansion anchor assembly, as set forth in claim 5, wherein said first and second recesses in said expansion sections being spaced from the first end of said expansion sleeve and from said connections of said expansion sections to said tubular section.

7. Expansion anchor assembly, as set forth in claim 1, wherein said expansion cone tapers inwardly from the first end toward the second end of said anchor rod, and said expansion cone has a conical surface with axially extending notches formed therein for gripping engagement with the interior of said expansion sections when said expansion cone is drawn into said expansion sleeve.

* * * * *